United States Patent [19]

Wada et al.

[11] 4,406,804
[45] Sep. 27, 1983

[54] HEAT ACCUMULATING MATERIAL

[75] Inventors: Takahiro Wada; Shoichi Ishihara, both of Katano; Ryoichi Yamamoto, Neyagawa, all of Japan

[73] Assignee: Matsushita Electric Industrial Co., Ltd., Osaka, Japan

[21] Appl. No.: 303,985

[22] Filed: Sep. 21, 1981

[30] Foreign Application Priority Data

Sep. 27, 1980 [JP] Japan .................................. 55-134905
Mar. 17, 1981 [JP] Japan .................................. 56-38954

[51] Int. Cl.³ .......................... C09K 3/34; C09K 5/00; C09K 5/06
[52] U.S. Cl. ........................................ 252/70; 252/71; 252/73; 252/75; 252/78.5; 126/900; 165/104.17
[58] Field of Search ....................... 252/70, 71, 73, 75, 252/76, 78.5; 126/900; 165/104.17

[56] References Cited

U.S. PATENT DOCUMENTS

| 266,205 | 10/1882 | Roth ....................................... 252/70 |
| 1,887,618 | 11/1932 | Bell ........................................ 252/70 |
| 1,894,775 | 1/1933 | Levenson ............................... 252/70 |
| 2,233,185 | 2/1941 | Smith ..................................... 252/75 |
| 3,944,494 | 3/1976 | Mahler .................................. 252/71 |

FOREIGN PATENT DOCUMENTS 2448739 12/1974 Fed. Rep. of Germany .
50-90583 7/1975 Japan.
50-90584 7/1975 Japan.
55-142078 6/1980 Japan.
55-142079 6/1980 Japan.
6701357 9/1967 Netherlands.

*Primary Examiner*—John E. Kittle
*Attorney, Agent, or Firm*—Stevens, Davis, Miller & Mosher

[57] ABSTRACT

The heat accumulating material provided according to this invention makes use of the latent heat of fusion of sodium acetate trihydrate, and it comprises, as blended in a system consisting of sodium acetate and water, at least one nucleation catalyst selected from the group of compounds consisting of tetrasodium pyrophosphate, trisodium monohydrogenpyrophosphate, disodium dihydrogenpyrophosphate and monosodium trihydrogenpyrophosphate. In use of this heat accumulating material, the sodium acetate trihydrate would not be overcooled owing to the overcooling preventing function of the nucleation catalyst but is unfailingly crystallized at a temperature close to the fusion point thereof to radiate latent heat of fusion. The overcooling preventing performance of the nucleation catalyst is not deteriorated even if it is subjected to more than 1,000 cycles of repetition of fusion and solidification, and thus the heat accumulating material maintains a very stabilized heat absorbing and radiating capacity.

5 Claims, 9 Drawing Figures

HEAT ACCUMULATING MATERIAL

This invention relates to a heat accumulating material comprising sodium acetate trihydrate as its principal ingredient.

There are generally known two types of heat accumulating material, one type utilizing the specific heat of the material and the other type making use of its latent heat. The heat accumulating material of the type utilizing the latent heat, as compared with the type utilizing the specific heat, is high in heat accumulating capacity per unit weight or unit volume and hence a smaller amount of material is needed for accumulating a required quantity of heat, allowing a size reduction of the heat accumulator. Also, the heat accumulating material making use of the latent heat of the material has an advantageous property that the temperature thereof would not drop with heat dissipation, unlike the heat accumulating material of the type utilizing the specific heat, and it radiates heat of a fixed temperature at the transition point of the material. Especially, the heat accumulating material utilizing the latent heat of fusion of a salt hydrate is remarkable for its high heat accumulating capacity per unit volume.

Sodium acetate trihydrate ($NaCH_3COO \cdot 3H_2O$, fusion point; approx. 58° C.) has been known as having a markedly high heat accumulating capacity among the salt hydrates and much expectation has been placed on it for its utilization as a heat accumulating material for many types of heating devices such as, for example, room heating systems. This material, however, has a quite disadvantageous property: when it is once fused, it tends to turn into an overcooled state and usually such overcooled state of the fused material would not break unless it is cooled down to around −20° C. Since such overcooled state is one where even if the material is cooled to its solidification point, no latent heat of fusion is radiated and the material is even further cooled below that temperature, such overcooling disposition is a fatal drawback for the heat accumulating material which utilizes latent heat of fusion.

The object of the present invention is to provide a heat accumulating material which keeps free from the so-called overcooling phenomenon of sodium acetate trihydrate and which is uncostly and has a stabilized heat absorbing and radiating performance as well as a high heat accumulating capacity per unit weight or unit volume.

The most salient feature of this invention consists in an aqueous solution having as its principal ingredient a system consisting of sodium acetate ($NaCH_3COO$) and water, said aqueous solution being mixed with at least one compound selected from the group consisting of tetrasodium pyrophosphate ($Na_4P_2O_7$), trisodium monohydrogenpyrophosphate ($Na_3HP_2O_7$), disodium dihydrogenpyrophosphate ($Na_2H_2P_2O_7$) and monosodium trihydrogenpyrophosphate ($NaH_3P_2O_7$) as a nucleation catalyst for preventing overcooling during crystallization of $NaCH_3COO \cdot 3H_2O$.

Figure 1:
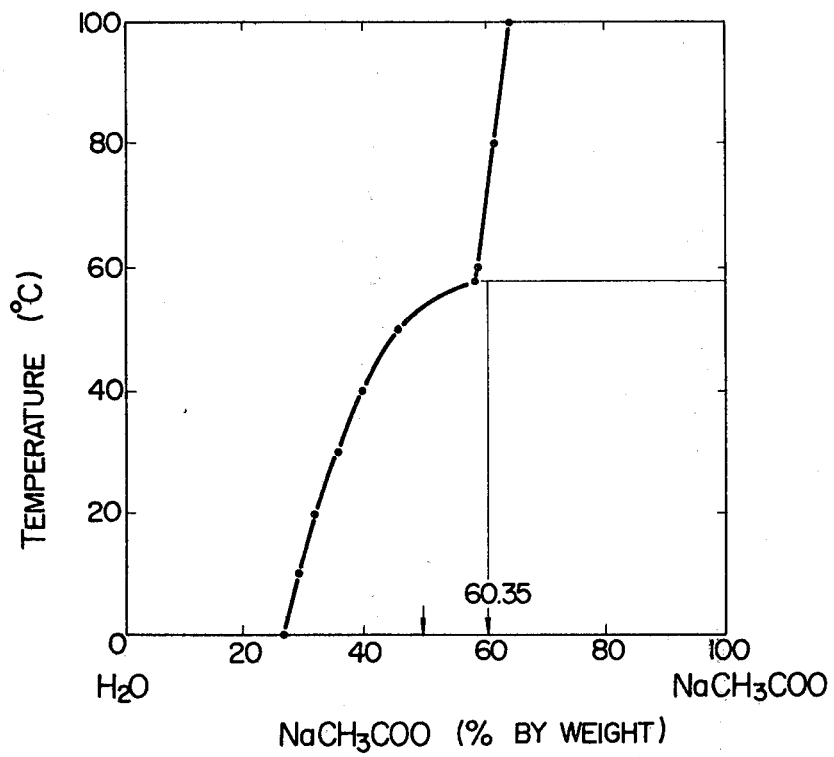
FIG. 1 is a phase diagram of the sodium acetate-water system.

In the phase diagram of the $NaCH_3COO$-$H_2O$ system of FIG. 1, it will be appreciated that the system consisting of 60.35% by weight of $NaCH_3COO$ and 39.65% by weight of $H_2O$ is identical with the composition of $NaCH_3COO \cdot 3H_2O$ and, in this composition, if no overcooling takes place, there occurs fusion and solidification at around 58° C. Also, the system consisting of 50% by weight of $NaCH_3COO$ and 50% by weight of $H_2O$ turns into a homogeneous $NaCH_3COO$ aqueous solution at a temperature above about 55° C. When this homogeneous aqueous solution is cooled below 55° C. and if no overcooling takes place, $NaCH_3COO \cdot 3H_2O$ begins to crystallize and the $NaCH_3COO \cdot 3H_2O$ crystal formation rate increases as cooling further proceeds. When cooling reaches around 30° C., approximately 60% of the whole mass of the system consisting of 50% by weight of $NaCH_3COO$ and 50% by weight of $H_2O$ is metamorphosed into the crystals of $NaCH_3COO \cdot 3H_2O$ and the remaining 40% stays as an aqueous solution of $NaCH_3COO$. Therefore, in the system consisting of 50% by weight of $NaCH_3COO$ and 50% by weight of $H_2O$, when it is cooled from a temperature above 55° C. to 30° C. and if there occurs substantially no overcooling, allowing proper crystallization of $NaCH_3COO \cdot 3H_2O$, then there is created a latent heat of a quantity approximately 60% of that in the case of the $NaCH_3COO \cdot 3H_2O$ composition per unit mass. Needless to say, increase of the water ratio in the $NaCH_3COO$-$H_2O$ aqueous solution results in an elevation of specific heat of the heat accumulating material and a corresponding increase of the amount of heat accumulation. Thus, by combining both heat accumulation by means of latent heat of fusion and heat accumulation by means of specific heat while controlling the rate of heat accumulation by latent heat to that by specific heat and also controlling the $NaCH_3COO$/$H_2O$ ratio, it is possible to greatly expand the scope of utilization of heat accumulating material. However, since the characteristic features of the heat accumulating material utilizing latent heat of fusion may be lost when using a system with a too low $NaCH_3COO$ concentration, it is advised to use a $NaCH_3COO$-$H_2O$ system containing more than 40% by weight of $NaCH_3COO$.

Conversely, when the $NaCH_3COO$ content in the $NaCH_3COO$-$H_2O$ system is increased, $NaCH_3COO \cdot 3H_2O$ is crystallized in the system containing more than 60.36% by weight of $NaCH_3COO$ if it is assumed that the overcooled state was broken when the system was cooled from a temperature above 58° C. to a temperature therebelow, as seen from FIG. 1. In this case, however, the whole system would not of course be turned into $NaCH_3COO \cdot 3H_2O$ but a part of the system remains as $NaCH_3COO$. Accordingly, in the case of the $NaCH_3COO$-$H_2O$ system containing more than 80% by weight of $NaCH_3COO$, the amount of latent heat per unit becomes less than about 50% of that in the case of the $NaCH_3COO \cdot 3H_2O$ composition. This leaves such a system quite impractical for use as a heat accumulating material. Therefore, the $NaCH_3COO$-$H_2O$ system which is actually used should be one in which the $NaCH_3COO$ content is not greater than 80% by weight.

Regarding the nucleation catalyst such as $Na_4P_2O_7$, $Na_3HP_2O_7$, $Na_2H_2P_2O_7$ and $NaH_3P_2O_7$, at least one of which is added in the $NaCH_3COO$-$H_2O$ based composition, it is found that, in the case of a $NaCH_3COO$-$H_2O$ system containing $NaCH_3COO$ in a concentration greater than 58% by weight, a satisfactory effect is provided by adding said compounds in amounts of 0.01 part by weight, 0.1 part by weight, 0.1 part by weight and 0.5 part by weight, respectively, to 100 parts by weight of said system. Addition of said compound or compounds in a greater amount can also produce a satisfactory antiovercooling effect. In the case of the system in which the $NaCH_3COO$ content is less than 58% by weight, it is necessary to add said compound or compounds in a greater amount than shown above, as the amount of said compound or compounds dissolved in the $NaCH_3COO-H_2O$ system increases as compared with the system containing $NaCH_3COO$ in a higher concentration than 58% by weight.

In use of the heat accumulating material of this invention in a heat accumulator for an air conditioner or the like, said material is usually used in an amount of about 100 to 1,000 kg. In this case, even if the $NaCH_3COO.3H_2O$ crystals are all fused down, the whole system would not become a uniform composition but a solution with a low $NaCH_3COO$ concentration in the upper portion and the precipitate of the nucleation catalyst and a high-concentration solution of $NaCH_3COO$ and nucleation catalyst in the lower portion. Therefore, even if the amount of the nucleation catalyst added in the composition is far less than the minimum requirement for forming a uniform solution, said catalyst would not be entirely dissolved in the $NaCH_3COO-H_2O$ aqueous solution, but it still retains and performs its due function. The minimum amount of the nucleation catalyst necessary for forming the crystal nucleus, that is, the lower limit of the mixable amount of said catalyst, depends on the amount of the $NaCH_3COO-H_2O$ system aqueous solution used and the size of the container of the heat accumulating material employed, so that the amount of said catalyst actually used needs to be properly determined according to the conditions of use.

However, addition of the nucleation catalyst in a too great amount is not desirable for the heat accumulating material as it leads to a reduction of heat accumulating capacity of the composition as a whole. For practical use, therefore, it is desirable that the nucleation catalyst be blended in an amount not exceeding 40 parts by weight to 100 parts by weight of the $NaCH_3COO-H_2O$ system.

As described above, the present invention is designed to provide a heat accumulating material free of the overcooling phenomenon by adding one or more of the compounds selected from $Na_4P_2O_7$, $Na_3HP_2O_7$, $Na_2H_2P_2O_7$ and $NaH_3P_2O_7$ as a nucleation catalyst in an $NaCH_3COO-H_2O$ based aqueous solution; but use of other nucleation catalysts with said compound or compounds is not prohibited in this invention. It is also acceptable to add a thickener such as carboxymethyl cellulose or sepiolite for the purpose of preventing sedimentation or flocculation of $NaCH_3COO$ or nucleation catalyst during fusion of $NaCH_3COO.3H_2O$, or other additives such as a solid-state radiating temperature adjustor.

The heat accumulating material according to this invention operates as follows. When the heat accumulating material of this invention is heated in a normal way, it first accumulates specific heat in a solid-phase condition, and when it is fused to change from the solid phase into a liquid phase, it begins to build up a massive accumulation of latent heat of fusion, and upon perfect change into the liquid phase, further accumulation of now specific heat is performed. In the case of radiation of heat, said material radiates specific heat in a normal way when the material is under a condition from a high-temperature liquid-phase condition through the solidifying temperature, but upon reaching the solidifying temperature, it radiates a large volume of accumulated latent heat of fusion without causing overcooling. Upon perfect change into a solid phase, further radiation of specific heat is effected with the temperature of the heat accumulating material itself being lowered.

Generally, in case no nucleation catalyst is added to a $NaCH_3COO-H_2O$ based aqueous solution, there takes place no radiation of latent heat of fusion even if the solidifying temperature is reached; and also even if the system is further cooled to reach room temperature there occurs no solidification nor any radiation of latent heat.

The present invention is further described by way of the non-limiting embodiments thereof which follow.

EXAMPLE 1

1,000 g of $NaCH_3COO.3H_2O$ and 0.5 g of $Na_4P_2O_7.10H_2O$ were placed in a cylindrical vessel measuring 100 mm in inner diameter and 100 mm in length, said vessel being closed by a plug having a thermocouple insert tube. The vessel was then put into a water bath and subjected to repeated and continuous heating and cooling between 70° C. and 40° C. This heat accumulating material remained substantially free of overcooling, and repeated fusion and solidification in a stable form.

Figure 2:
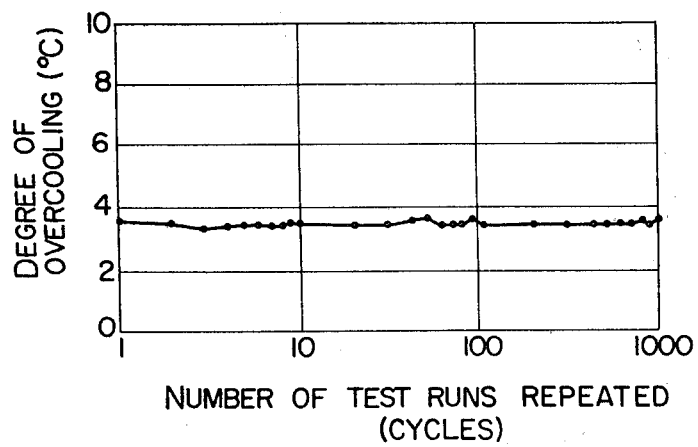
FIGS. 2 to 9 are graphs showing the changes in the degree of overcooling of the typical examples of heat accumulating material of this invention when they were subjected to 1,000 repeated heating and cooling cycles.

FIG. 2 shows the change of the the degree of overcooling, i.e., the difference between solidification temperature and the temperature at which overcooling ceases, where heating and cooling were repeated 1,000 times continuously. In the graph, the number of times of repetition of the heating-cooling cycle is plotted as the abscissa on a logarithmic scale and the degree of overcooling (°C.) is plotted as the ordinate. As seen from this graph, the heat accumulating material of this embodiment, even if subjected to 1,000 times of repeated heating and cooling, maintains the degree of overcooling within a limited range of 3°–4° C., indicating that the material suffered no deterioration in its overcooling preventing function and worked effectively throughout the heating and cooling cycles. The latent heat of fusion accumulated in the heat accumulating material of this embodiment was 63 cal/g, signifying that this product has enough heat accumulating capacity for use as a heat accumulating material.

EXAMPLE 2

Figure 3:
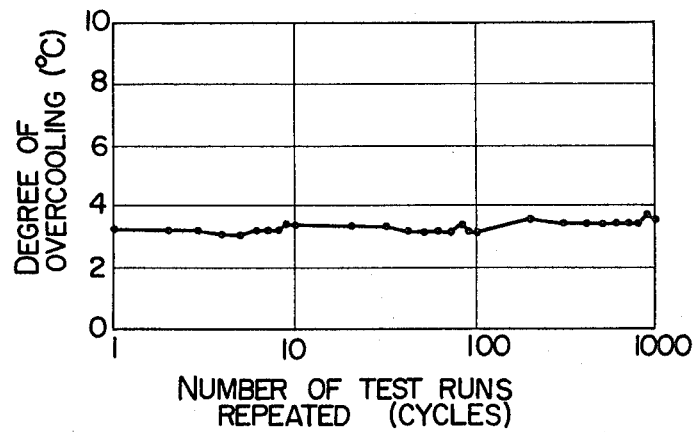

750 g of $NaCH_3COO.3H_2O$ and 250 g of $Na_4P_2O_7.10H_2O$ were placed in a cylindrical vessel similar to that used in Example 1, and the vessel was closed with a plug having a thermocouple insert tube, then put into a water bath and subjected to continuous heating and cooling between 70° and 40° C. The heat accumulating material of this embodiment showed almost no overcooling, and repeated fusion and solidification in a stable way. FIG. 3 shows the change of the degree of overcooling when said material has undergone 1,000 cycles of repeated heating and cooling. The graph shows that even if the heat accumulating material of this embodiment is subjected to 1,000 cycles of repeated heating and cooling, the degree of overcooling stays stably within the range of 3°–4° C., indicating no deterioration of the overcooling preventing function and effective working of the material through said heating and cooling cycles. The measurement of the latent heat of fusion built up by the heat accumulating material of the instant embodiment gave a value of 47 cal/g, which shows enough heat accumulating capacity of the product for use as a heat accumulating material.

EXAMPLE 3

500 kg of $NaCH_3COO.3H_2O$ and 5 g of $Na_4P_2O_7.10H_2O$ were fed into a cylindrical vessel measuring 80 cm in inner diameter and 90 cm in height and having a heater in its inside, and the vessel was closed with a cover having a thermocouple insert tube. The contents of the vessel were heated to 70° C. by the heater in the vessel to fuse the whole of the $NaCH_3COO.3H_2O$. Then the heating was stopped to cool the material, whereby overcooling was eliminated at 54.5° C. and the material temperature of the vessel elevated to 58.1° C. Therefore, heating and cooling were repeated 50 times. The degree of overcooling stayed stably within the range of 3°–4° C. with no overcooling being allowed to set in, indicating that the product of this embodiment can satisfactorily function as a heat accumulating material.

Although a decahydrate of $Na_4P_2O_4$ is used in the foregoing Examples 1–3, it is also possible to use an anhydrate. When using an anhydrate, it is reacted with water in the heat accumulating material to convert it into a decahydrate.

EXAMPLE 4

1,000 g of $NaCH_3COO.3H_2O$ and 1.0 g of $Na_3HP_2O_7$ were fed into a cylindrical vessel having an inner diameter of 100 mm and a length of 100 mm, and the vessel was closed by a plug having a thermocouple insert tube, put into a water bath and subjected to continuous heating and cooling between 70° C. and 40° C. The heat accumulating material of this embodiment remained substantially free of overcooling, and repeated fusion and solidification stably.

Figure 4:
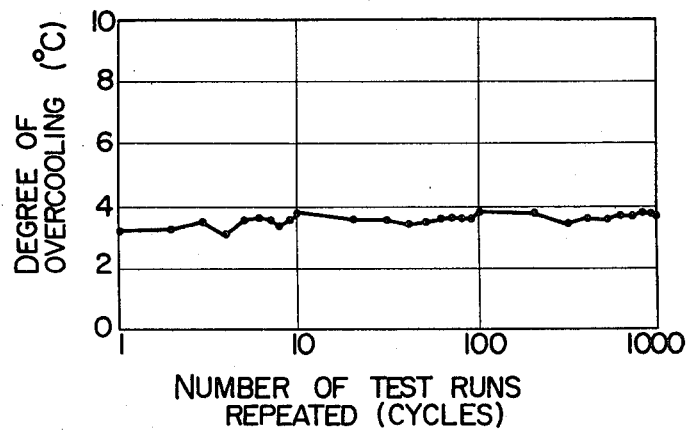

FIG. 4 shows the change of the degree of overcooling in 1000 cycles of continuous repetition of heating and cooling. As seen from this graph, the degree of overcooling of the heat accumulating material of this embodiment remained stably within the range of 3°–4° C. in 1,000 cycles of repetition of heating and cooling, indicating that said product suffered no deterioration in its overcooling preventing function and worked effectively througout the test. The latent heat of fusion accumulated by the product of this embodiment was 63 cal/g, showing a satisfactory heat accumulating capacity of the product as a heat accumulating material.

EXAMPLE 5

750 g of $NaCH_3COO.3H_2O$ and 250 g of $Na_3HP_2O_7$ were placed in a cylindrical vessel similar to that used in Example 4, and this vessel was closed by a plug having a thermocouple insert tube, put into a water bath and subjected to continuous heating and cooling between 70° C. and 40° C. The heat accumulating material of this embodiment has undergone almost no overcooling, and repeated fusion and solidification in a stable state.

Figure 5:
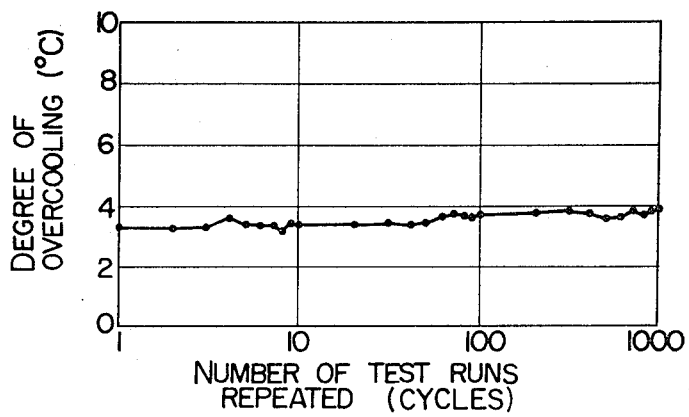

FIG. 5 is a graph showing the change of the degree of overcooling when the product was subjected to 1,000 cycles of successive repetition of heating and cooling. The graph shows that the heat accumulating material of this embodiment, even if subjected to 1,000 cycles of repeated heating and cooling, maintains the degree of overcooling stably within the range of 3°–4° C. without suffering any deterioration in its overcooling preventing function but working effectively throughout the test. The latent heat of fusion in the product of this embodiment was 47 cal/g, indicating a sufficient heat accumulating capacity of the product for use as a heat accumulating material.

EXAMPLE 6

500 kg of $NaCH_3COO.3H_2O$ and 20 g of $Na_3HP_2O_7$ were fed into a cylindrical vessel of 80 cm in inner diameter and 90 cm in height having a heater provided therein, said vessel being closed with a cover having a thermocouple insert tube. The contents of the vessel were heated to 70° C. by the heater in the vessel to fuse the whole of said $NaCH_3COO.3H_2O$. Then the heating by the heater was stopped to cool the material, whereby the state of overcooling was broken at 55° C. and the internal temperature of the vessel elevated to 58.0° C. Thereafter, the material was subjected to 50 cycles of repetition of heating and cooling, but the degree of overcooling stayed stably within the range of 3°–4° C. with no overcooling being allowed to set in, and it could thus be confirmed that the product of this embodiment can well serve as a heat accumulated material.

EXAMPLE 7

1,000 g of $NaCH_3COO.3H_2O$ and 1.0 g of $Na_2H_2P_2O_7$ were supplied into a cylindrical vessel having an inner diameter of 100 mm and a length of 100 mm, and the vessel was closed by a plug having a thermocouple insert tube, put into a water bath and subjected to continuous heating and cooling between 70° C. and 40° C. The heat accumulating material of this embodiment remained substantially free of overcooling, and repeated fusion and solidification in a stable form.

Figure 6:
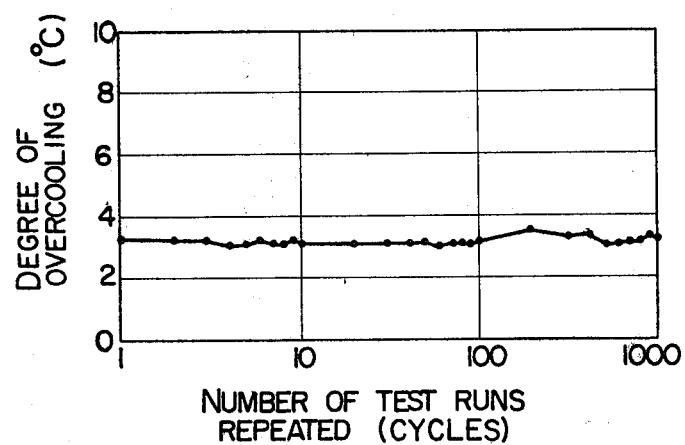

FIG. 6 shows the change of the degree of overcooling in 1,000 cycles of repetition of heating and cooling. It will be seen from this graph that even if the heat accumulating material of this embodiment is subjected to 1,000 cycles of repeated heating and cooling, the degree of overcooling remains stably within the range of 3°–4° C., indicating no setback in the overcooling preventing function and constant effective working of the material throughout the testing cycles. The measurement of the latent heat of fusion accumulated in the product of this embodiment showed a value of 62 cal/g, suggesting ample heat accumulating capacity of the product for practical use as a heat accumulating material.

EXAMPLE 8

750 g of $NaCH_3COO.3H_2O$ and 250 g of $Na_2H_2P_2O_7$ were placed in a cylindrical vessel the same as that used in Example 7, and this vessel was closed by a plug having a thermocouple insert tube, put into a water bath and subjected to repeated heating and cooling between 70° C. and 40° C. The heat accumulating material of this embodiment showed substantially no sign of overcooling, and repeated fusion and solidification in a stable state.

Figure 7:
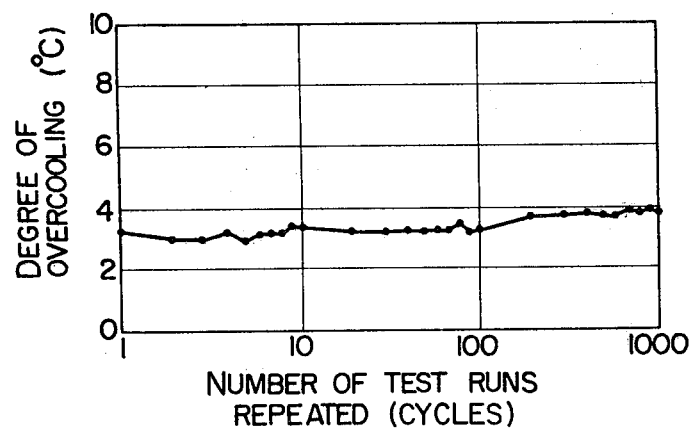

FIG. 7 shows the change of the degree of overcooling in 1,000 cycles of repetition of heating and cooling of the product. As seen from the figure, the degree of overcooling in the heat accumulating material of this embodiment stays stably within the range of 3°–4° C. throughout 1,000 cycles of repetition of heating and cooling, indicating no decrease in the overcooling preventing function and lasting effective working of the material in the test. The latent heat of fusion accumulated by the product of this embodiment was measured at 45 cal/g, showing enough heat accumulating capacity of the product for use as a heat accumulating material.

EXAMPLE 9

500 kg of $NaCH_3COO.3H_2O$ and 50 g of $Na_2H_2P_2O_7$ were fed into a cylindrical vessel of 80 cm in inner diameter and 90 cm in height having a heater incorporated therein, and the vessel was closed with a cover having a thermocouple insert tube. The contents were heated to 70° C. by the heater in the vessel to fuse the whole of said $NaCH_3COO.3H_2O$. Then the heating by the heater was stopped, allowing the material to cool, whereby the state of overcooling gave way at 54.9° C. and the internal temperature of the vessel rose to 58.1° C. Thereafter, heating and cooling were repeated 50 times, but the degree of overcooling stayed stably within the range of 3°–4° C. with no state of overcooling being allowed to set in, showing enough capability of the product of this embodiment to function as a heat accumulating material.

EXAMPLE 10

1,000 g of $NaCH_3COO.3H_2O$ and 5.0 g of $NaH_3P_2O_7$ were fed into a cylindrical vessel of 100 mm in inner diameter and 100 mm in length, and the vessel was closed by a plug having a thermocouple insert tube, but into a water bath and subjected to continuous and repeated heating and cooling between 70° C. and 40° C. Substantially no overcooling was seen in the heat accumulating material of this invention and the material repeated fusion and solidification in a stable state.

Figure 8:
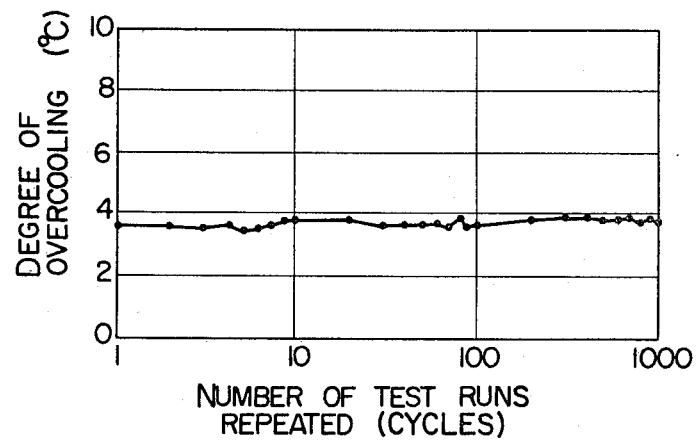

FIG. 8 shows the change of the degree of overcooling in 1,000 continuous cycles of repetition of heating and cooling. As noted from this graph, the heat accumulating material of this embodiment, when subjected to 1,000 cycles of repetition of heating and cooling, maintains the degree of overcooling within the range of 3°–4° C., indicating no deterioration of the overcooling preventing function and effective working of the material. The latent heat of fusion built up in the product of this embodiment was 61 cal/g, which attests to enough heat accumulating capacity of the product for use as a heat accumulating material.

EXAMPLE 11

750 g of $NaCH_3COO.3H_2O$ and 250 g of $NaH_3P_2O_7$ were placed in a cylindrical vessel similar to that used in Example 1, and the vessel was closed by a plug having a thermocouple insert tube, placed in a water bath and subjected to continuous heating and cooling cycles between 7° and 40° C. The heat accumulating material of this embodiment stayed substantially free of overcooling, and repeated fusion and solidification in a stable state.

Figure 9:
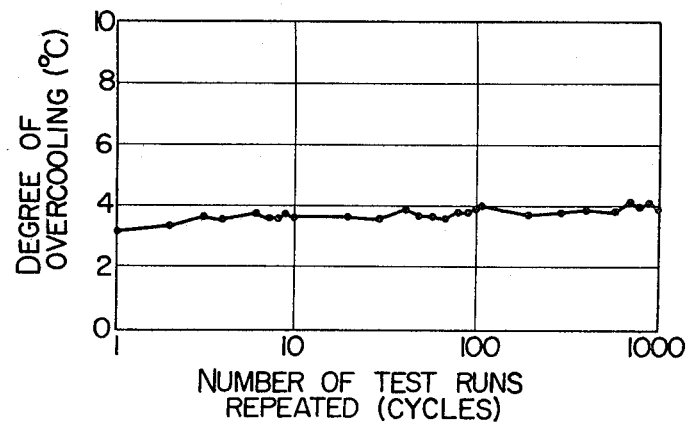

Shown in FIG. 9 is the change of the degree of overcooling in 1,000 cycles of repetition of heating and cooling. It will be appreciated from this graph that the degree of overcooling in the product of this embodiment is stably maintained within the range of 3°–4° C. even after 1,000 repeated heating and cooling cycles, indicating no lowering of the overcooling preventing performance and lasting effective action of the product. Also, the product showed 44 cal/g of latent heat of fusion, verifying a sufficient heat accumulating capacity of the product as a heat accumulating material.

EXAMPLE 12

500 kg of $NaCH_3COO.3H_2O$ and 50 g of $NaH_3P_2O_7$ were supplied into a cylindrical vessel of 80 cm in inner diameter and 90 cm in height having a heater incorporated therein, and the vessel was closed with a cover having a thermocouple insert tube. The contents were heated to 70° C. by the heater in the vessel to fuse the entirety of the $NaCH_3COO.3H_2O$. Then the heating by the heater was stopped to allow cooling of the material. The state of overcooling ceased at 54.3° C. and the internal temperature of the vessel was elevated to 58.0° C. Thereafter, heating and cooling were repeated 50 times, but the degree of overcooling remained stably within the range of 3°–4° C. with the state of overcooling broken, corroborating the ability of the product of this embodiment to excellently function as a heat accumulating material.

COMPARATIVE EXAMPLE 500 kg of $NaCH_3COO.3H_2O$ was placed in the same vessel as used in Example 3, and $NaCH_3COO.3H_2O$ was heated to 70° C. by the heater in the vessel to fuse the entirety of said compound. Then, when heating by the heater was stopped to allow cooling of the material, the material was overcooled down to room temperature.

As appreciated from the foregoing examples, the heat accumulating material of this invention, prepared by mixing in an $NaCH_3COO-H_2O$ system at least one compound selected from the group consisting of $Na_4P_2O_7$, $Na_3HP_2O_7$, $Na_2H_2P_2O_7$ and $NaH_3P_2O_7$ as the $NaCH_3COO.3H_2O$ nucleation catalyst, has a stabilized heat absorbing and radiating capacity to keep substantially free of the so-called overcooling phenomenon and is also uncostly and high in heat accumulating capacity. Although we have shown in the Examples the cases where the above-said nucleation catalysts were used singly, the same action and effect can be obtained by using said catalysts in combination, and it is also possible to use other known nucleation catalyst(s) jointly with the above-cited compound(s).

The heat accumulating material according to this invention is adaptable not only to heat accumulators for air-conditioning but also to all types of devices utilizing heat accumulation such as regenerative heat retainers.

What is claimed is:

1. A heat accumulating material characterized in that at least one nucleation catalyst, selected from the group of compounds consisting of tetrasodium pyrophosphate ($Na_4P_2O_7$), trisodium monohydrogenpyrophosphate ($Na_3HP_2O_7$), disodium dihydrogenpyrophosphate ($Na_2H_2P_2O_7$) and monosodium trihydrogenpyrophosphate ($NaH_3P_2O_7$) is blended in a system consisting of sodium acetate ($CH_3COONa$) and water.

2. The heat accumulating material according to claim 1, wherein sodium acetate is present in an amount of 40–80% by weight in the system consisting of sodium acetate and water.

3. The heat accumulating material according to claim 1, wherein the amount of the nucleation catalyst does not exceed 40 parts by weight to 100 parts by weight of the system consisting of sodium acetate and water.

4. The heat accumulating material according to claim 1, wherein the tetrasodium pyrophosphate is in the form of tetrasodium pyrophosphate decahydrate ($Na_4P_2O_7.10H_2O$).

5. A heat accumulating material characterized in that a system consisting of sodium acetate and water, containing 40–80% by weight of sodium acetate, is blended with at least one nucleation catalyst selected from the group consisting of tetrasodium pyrophosphate, trisodium monohydrogenpyrophosphate, disodium dihydrogenpyrophosphate, monosodium trihydrogenpyrophosphate and tetrasodium pyrophosphate decahydrate, said nucleation catalyst being blended in an amount no greater than 40 parts by weight per 100 parts by weight of said system.

* * * * *